United States Patent [19]

Yoshino et al.

[11] Patent Number: 4,670,761

[45] Date of Patent: Jun. 2, 1987

[54] INK-JET RECORDING APPARATUS

[75] Inventors: Eiji Yoshino; Yasumasa Matsuda, both of Hitachi; Takahiro Yamada, Ibaraki, all of Japan

[73] Assignees: Hitachi, Ltd.; Hitachi Seiko, Ltd., both of Tokyo, Japan

[21] Appl. No.: 748,200

[22] Filed: Jun. 24, 1985

[30] Foreign Application Priority Data

Jun. 22, 1984 [JP] Japan ............................... 59-127490

[51] Int. Cl.[4] ............................................ G01D 15/18

[52] U.S. Cl. ....................................... 346/75; 346/138

[58] Field of Search .................................. 346/75, 138

[56] References Cited

U.S. PATENT DOCUMENTS 3,928,718 12/1975 Sagae et al. ........................... 346/75

3,946,398 3/1976 Kyser et al. ......................... 346/1.1

3,987,492 10/1976 Kraus et al. ........................... 346/75

3,999,188 12/1976 Yamada ................................ 346/75

4,065,773 12/1977 Berry .................................... 346/75

4,083,053 4/1978 Ouchi et al. .......................... 346/75

4,350,986 9/1982 Yamada ................................ 346/75

*Primary Examiner*—E. A. Goldberg

*Assistant Examiner*—Gerald E. Preston

*Attorney, Agent, or Firm*—Antonelli, Terry & Wands

[57] ABSTRACT

An ink-jet printer including an ink jet nozzle for ejecting ink droplets onto the recording paper which is moved relative to the nozzle so that dots of ink are printed in the form of a pattern. The trajectory of flying ink droplets is deflected along the direction of the relative movement under control based on the measurement of the relative movement speed.

12 Claims, 5 Drawing Figures

INK-JET RECORDING APPARATUS

BACKGROUND OF THE INVENTION

The present invention relates to an ink-jet recording apparatus and, particularly, to an improved ink-jet recording apparatus of a type, in which ink droplets are ejected from a nozzle and impinge on the recording medium to form dots thereon, and the position of the record is affected by the change in the relative speed between the nozzle and the recording medium.

It is important for an ink-jet recording apparatus to make a dot record of ink droplets accurately at a specified position on the recording medium. Particularly, in case of color recording, ink droplets ejected from more than one nozzle must produce dots accurately at specified positions on the recording medium.

Ink-jet recording apparatus recording information on the recording paper which is rotated on the drum are disclosed in U.S. Pat. No. 3,928,718 by Syoji Sagae et al., and U.S. Pat. No. 3,999,188 by Takahiro Yamada et al. In these apparatus, ink droplets are ejected from the nozzle at a fixed time interval, and therefore if the rotational speed of the drum varies, the dots are not recorded on the correct position of the recording paper, resulting in an uneven pitch of dots. These ink-jet recording apparatus are capable of recording images in color through the arrangement of more than one nozzle for various colors in the circumferential direction of the drum. However, when a certain pattern of image is intended to produce using a plurality of nozzles, recorded patterns by the nozzles would be out of alignment with each other unless each nozzle produces a pattern respectively at a correct position accurately. A possible cause of such a faulty print result is induced by the fluctuation of the drum speed.

SUMMARY OF THE INVENTION

This invention contemplates to solve the foregoing prior art problem, and its prime object is to provide an ink-jet recording apparatus for recording images accurately at specified positions on the recording paper even under the fluctuating rotation of the drum.

The present invention resides in an ink-jet recording apparatus including a device for ejecting ink droplets through a nozzle, a device for moving a recording medium across and relative to the trajectory of the ink droplets, and a device for controlling the trajectory of the ink droplets in accordance with the information signal to be recorded so that each droplet reaches a specified position on the recording medium, wherein the control device comprises a device for producing a signal in terms of the relative speed between the recording medium and the nozzle, a device for charging ink droplets electrostatically in correspondence to the speed signal, and a device for deflecting the ink droplets in the direction along the relative movement to an extent in proportion to the amount of charges on the ink droplets.

The inventive apparatus prevents the displacement of a pattern record caused by the variation in the relative speed between the recording medium and the nozzle by controlling the deflection of ink droplets.

DESCRIPTION OF THE PREFERRED EMBODIMENTS

Figure 1:
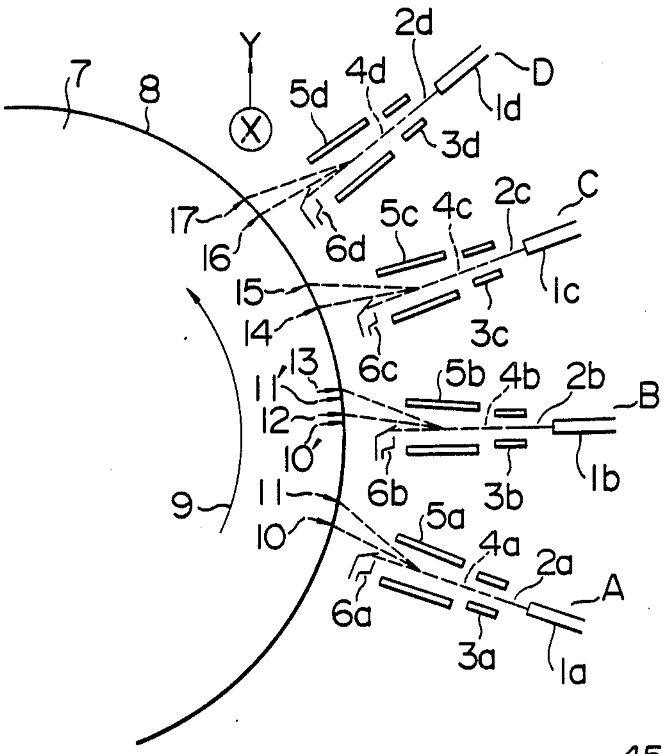
FIG. 1 is an illustration explaining the deviation of a pattern produced by more than one recording head.

FIG. 1 explains the displacement of a pattern record produced by four ink-jet nozzles when the information signal is intended to record at a specified position on the recording paper. The four recording heads A, B, C and D are moved in unison in the axial direction of a drum 7, i.e., perpendicularly to the drawing as shown by symbol ⊗. The recording heads A–D have associated nozzles 1*a*–1*d*, which are adapted to vibrate at an ultrasonic frequency so that jets of pressurized ink 2*a*–2*d* released from the nozzles 1*a*–1*d* are formed into ink droplets 4*a*–4*d* at the same frequency as of the ultrasonic vibration. The ink droplets 4*a*–4*d* are charged in proportion to the information signal components to each head by means of charging electrodes 3*a*–3*d*, and the projectile lines of the charged ink droplets are deflected in proportion to the amount of charges by deflection electrodes 5*a*–5*d* in the direction shown by the arrow Y which is perpendicular to a plane including the direction shown by the symbol ⊗. Gutters 6*a*–6*d* are provided at a position partly interfering the flight paths of the ink droplets 4*a*–4*d* so that ink droplets unused for recording are caught by them. Each of the recording heads A–D is consistent, but in a 90° rotation, with those disclosed in the above-mentioned U.S. Pat. Nos. 3,928,718 and 3,999,188.

In producing a complete record of the information signal using the recording heads A–D at one position on the recording paper 8 placed on the drum 7 rotating in the direction shown by the arrow 9, the voltages carrying information signal components for the heads A–D are applied to the charging electrodes 3*b*–3*d* of heads B–D with respective time lags produced by delay circuits, e.g. a shift register, with respect to the time point of voltage application to the charging electrode 3*a* of recording head A. Namely, the recording head B is activated at a delayed time point when a record ranging 10 to 11 produced by the head A has come to the position ranging 12 to 13. Subsequently, the recording head C is activated at a delayed time point when the record ranging 12 to 13 produced by the head B has come to the position ranging 14 to 15. Finally, the recording head D is activated at a delayed time point when the record ranging 14 to 15 produced by the head C has come to the position ranging 16 to 17, and a composite pattern by the four heads for the information signal is completed.

In this case, it is necessary that the range 10–11 of record produced by the head A, the range 12–13 of record produced by the head B, the range 14–15 of record produced by the head C and the range 16–17 of record produced by the head D are coincident with each other on the recording paper 8. However, if the drum speed varies during the recording operations by the four heads, it will arise, for example, that a record is produced by the head B at the position ranging 12–13 when the record ranging 10–11 produced by the head A has come to a position ranging 10'–11'. This results in a displacement of the recording range 12–13 by the head B form the recording range 10'–11' by the head A. The displacement of record also occurs at the ranges 14–15 and 16–17 by the remaining recording heads although it is not shown in the figure.

For a recording system with a single recording head, the above-mentioned problem results in an uneven interval of dots aligning in the drum rotational direction, and uneven recording caused by this phenomenon can be prevented as described in the following.

Figure 2:
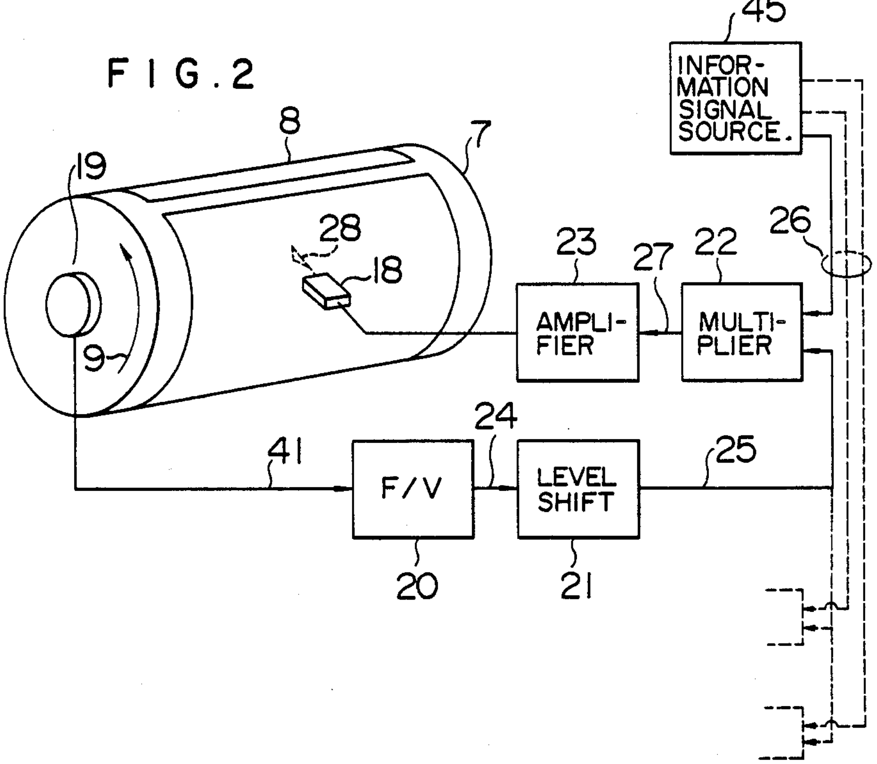
FIG. 2 is a block diagram of the inventive ink-jet recording apparatus.

The ink-jet recording apparatus shown in FIG. 2 is of the electrostatic modulation type as disclosed in the above-mentioned U.S. Pat. Nos. 3,928,718 and 3,999,188, but with a modification being made such that the recording head is installed in a 90° rotation so that ink droplets are deflected in the direction along the rotational direction of the drum.

Figure 3:
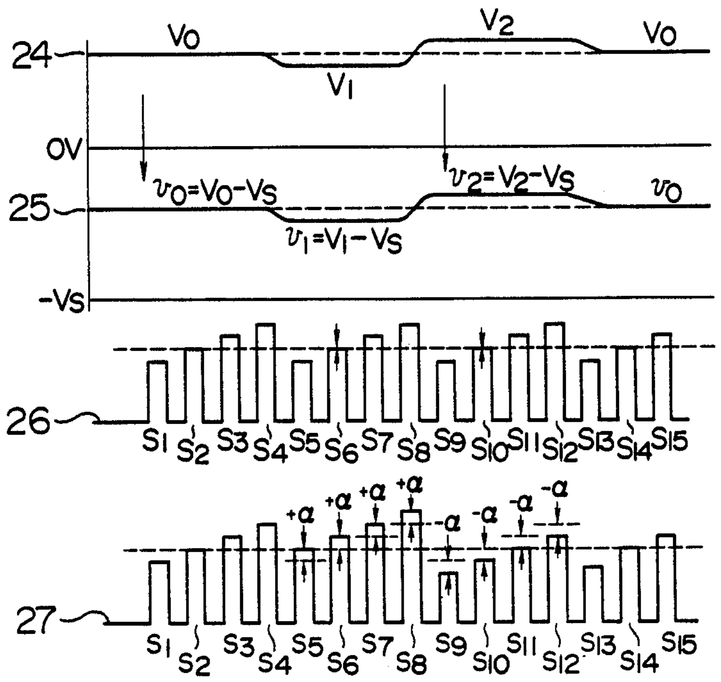
FIG. 3 is a waveform diagram showing the operation of the above arrangement.

Referring to FIGS. 2 and 3, an encoder 19 is coupled to the drive shaft (not shown) of the drum 7 so as to produce a rectangular pulse signal 41 having a frequency dependent on the drum speed. The signal 41 is received by a frequency-to-voltage (F/V) converter 20, which produces a voltage signal 24 in proportion to the frequency of the pulse signal 41. Accordingly, when the drum speed varies, the frequency of the pulse signal 41 from the encoder 19 is varied, and thus the voltage signal 24 produced by the F/V converter 20 is varied. As shown in FIG. 3, the voltage signal 24 varies from a voltage $V_0$ at the normal drum speed to a voltage $V_1$ in response to a fall in the drum speed, and it varies from $V_0$ to a voltage $V_2$ in response to a rise in the drum speed. The voltage signal 24 carrying a voltage level $V_0$, $V_1$ or $V_2$ is received by a level shift circuit 21, which produces a voltage signal 25 carrying a voltage level $v_0$, $v_1$ or $v_2$ derived from $V_0$, $V_1$ or $V_2$, respectively, but shifted in the negative direction with respect to the reference voltage level Vs. The absolute values of $V_0$, $V_1$ and $V_2$ are in the order of $|V_2|>|V_0|>|V_1|$, but as a result of negative shift by Vs the absolute values of $v_0$, $v_1$ and $v_2$ become in the order of $|v_2|<|v_1|<|v_0|$. Accordingly, the circuit 21 provides a higher voltage in response to a lower drum speed, and a lower voltage in response to a higher drum speed.

The voltage signal 25 is received by a multiplier 22, in which it is multiplied by an information signal 26 supplied from a signal source 45. In FIG. 3, signal levels S1 through S4 in the information signal 26 sampled in the normal drum speed are multiplied by the voltage level $v_0$ of the voltage signal 25 corresponding to the normal drum speed, and signal levels s1 through s4 are produced in the output 27 of the multiplier 22. For the convenience of explanation, the voltage levels S1–S4 of the information signal 26 are each assumed to be equal to voltage levels s1–s4 of the output 27 from the multiplier 22.

Signal levels S5–S8 of the information signal 26 received at a lower drum speed are multiplied by the larger voltage value $v_1$ of the voltage signal 25, so that they are modified by an increment of $+\alpha$ to larger levels s5–s8 in the output signal 27 than the voltage levels of signals S5–S8 (output signals s1–s4) of the information signal 26. Conversely, signal levels S9–S12 in the information signal 26 received at a higher drum speed are multiplied by the larger voltage value $v_2$ of the voltage signal 25, so that they are modified by a decrement of $-\alpha$ to smaller levels s9–s12 in the output signal 27.

The modified signal levels s1–s4, s5–s8 and s9–s12 in the output 27 are amplified by an amplifier 23 and supplied to the charging electrodes (not shown) in the recording head 18. Ink droplets 28 charged electrostatically by the charging electrodes in proportion to the voltage levels s1–s12 are deflected for their flight path by the deflecting electrodes (not shown) by amounts in proportion to the respective charges along the drum rotational direction shown by the arrow 9, and they reach the specified points (not shown) on the recording paper 8 set on the drum 7.

Namely, when the drum 7 rotates at the normal speed, sampled signal levels S1–S4 in the information signal 26 are recorded at the specified position on the recording paper 8 by the ink droplets 28 which are charged to the voltage levels s1–s4 equal to S1–S4, respectively. When the drum speed falls, sampled signal levels S5–S8 are recorded at the specified position on the paper 8 by the ink droplets 28 which are charged to the voltage levels s5–s8 larger than S5–S8 to cause an increased deflection angle, i.e., a longer trajectory distance, in the direction of drum rotation. When the drum speed rises, sampled signal levels S9–S12 are recorded at the specified position on the paper 8 by the ink droplets 28 which are charged to the voltage levels s9–s12 smaller than S9–S12 to cause a decreased deflection angle, i.e., a shorter trajectory distance, in the direction of drum rotation.

The foregoing embodiment illustrated in FIGS. 2 and 3 can be applied identically to the arrangement with more than one recording head.

Figure 5:
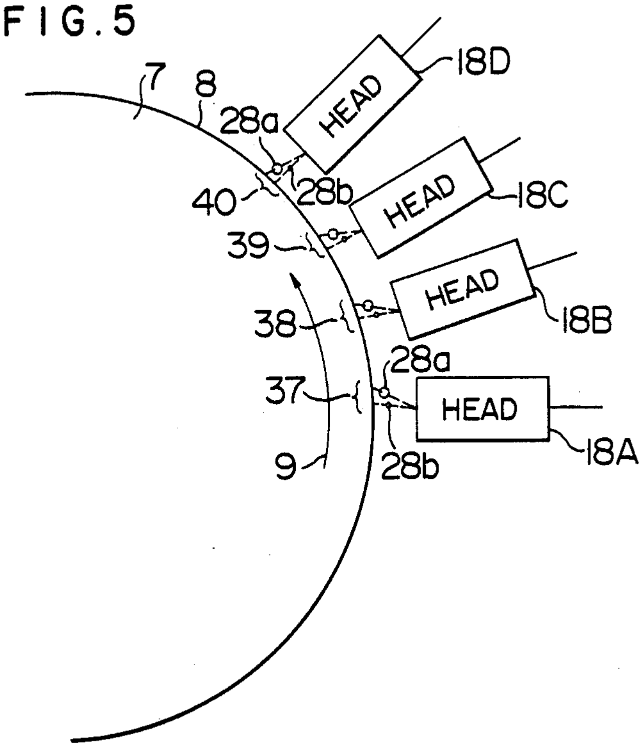
FIG. 5 is a block diagram showing the inventive color ink-jet recording apparatus using more than one recording head.
Figure 4:
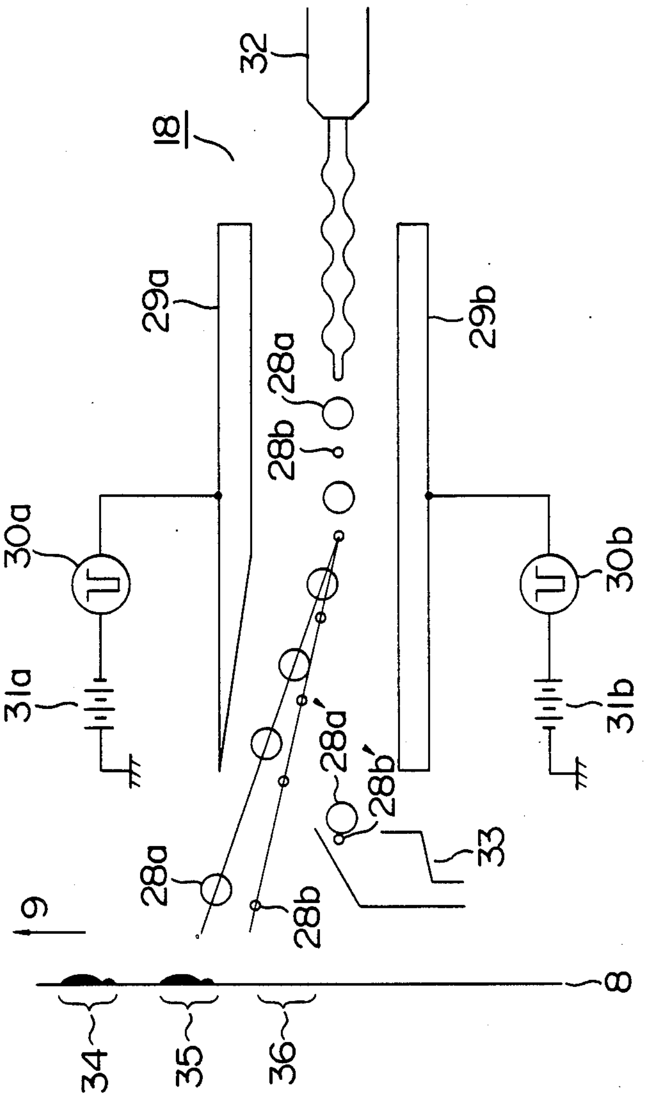
FIG. 4 is an illustration used to explain an embodiment of the recording head used in a modified system arrangement.

FIG. 4 shows an embodiment of the recording head according to the present invention, and FIG. 5 shows the arrangement for color recording using four recording heads each shown in FIG. 4.

In FIG. 4, the amplitude of ultrasonic vibration applied to a nozzle 32 of a recording head 18 is controlled so that ink droplets **28*a* having a larger diameter and ink droplets 28*b* having a smaller diameter are produced alternately at the frequency of the ultrasonic vibration. Charging-deflecting electrodes 29*a* and 29*b* are applied with voltage pulses supplied from information signal sources 30*a* and 30*b* that are superimposed by bias voltages supplied from voltage sources 31*a* and 31*b*** respectively.

The larger ink droplet **28*a* flies faster than the smaller ink droplet 28*b*. Both ink droplets 28*a* and 28*b* are charged in proportion to the pulse voltage representing the information signal, and in this case the amount of charges given to the larger ink droplet 28*a* is more than that given to the smaller ink droplet 28*b*. Accordingly, by application of the bias voltages provided by the voltage sources 31*a* and 31*b* to the charging-deflecting electrodes 29*a* and 29*b*, the larger ink droplet 28*a* is deflected in a greater angle than the smaller ink droplet 28*b*. On this account, when the recording paper 8 is moved at a constant speed in the direction shown by the arrow 9 along the deflecting direction, the larger ink droplet 28*a* flies faster on a longer projectile line and the smaller ink droplet 28*b* flies slower on a shorter projectile line resulting in the arrival of both droplets 28*a* and 28*b*, without merging, at specified positions 34, 35, and so on on the recording paper 8. When both ink droplets 28*a* and 28*b* are not charged and, thus, not deflected, the smaller ink droplet 28*b*' is merged into the larger ink droplet 28a' because of their different flight speed, and such unused ink droplets are collected by a gutter 33**.

Although the foregoing recording head is designed to produce larger and smaller ink droplets 28a and 28b for making pattern records of information signal at the specified positions 34, 35, 36 and so on on the recording paper 8, it can also be applied to ink-jet recording apparatus of the on-demand type producing ink droplets of separate flight speeds only when necessary, as disclosed in U.S. Pat. No. 3,946,398 by Edmond L. Kyser et al.

FIG. 5 shows the arrangement for color recording employing recording heads 18A, 18B, 18C and 18D of the type shown in FIG. 4 for making pattern records at specified positions 37, 38, 39 and 40, respectively, on the recording paper 8 through the control of the deflection angle for compensating the displacement of recording position due to different flight speeds of larger and smaller ink droplets 28a and 28b and the displacement of recording position due to the fluctuation of the drum speed as described previously. In operation, the recording head 18A is first activated to produce larger and smaller ink droplets 28a and 28b so that a pattern record is made at the specified position 37. Thereafter, when the drum 7 has rotated in the direction shown by the arrow 9 so that the position 37 becomes coincident with the position 38, the recording head 18B is activated to produce larger and smaller ink droplets so that the same position 37 is recorded again this time by the head 18B. In this manner, recording takes place when the initial recording position 37 has arrived at the head positions 39 and 30 successively, and a color pattern record is completed.

Although in the foregoing embodiments ink droplets 28, 28a and 28b are deflected in the direction along the drum rotational direction shown by the arrow 9, the same effect is achieved by deflecting ink droplets in the direction opposite to the drum rotational direction.

We claim:

1. An ink-jet recording apparatus comprising:

ink droplet producing means having a nozzle for ejecting droplets of ink through the nozzle;

means for moving a recording medium relative to the flight path of said ink droplets across said flight path; and control means which controls the deflection of said ink droplets in accordance with an information signal to be recorded so that each of said ink droplets reaches a specified position on said recording medium, wherein said control means comprising:

means for generating a speed signal representing a relative speed between said recording medium and said nozzle;

charging means for charging said ink droplets electrostatically in proportion to the level of said speed signal; and deflection means for deflecting said ink droplets to an extent in proportion to the amount of charges on said ink droplets along the direction of said relative movement.

2. An ink-jet recording apparatus according to claim 1, wherein said ink droplet producing means comprises means for producing ink droplets by vibrating said nozzle in accordance with information signal to be recorded.

3. An ink-jet recording apparatus according to claim 1, wherein said nozzle comprises a plurality of nozzle elements aligned in a predetermined interval along the direction of relative movement between said recording medium and said nozzle elements, said charging means and deflection means being provided in correspondence to said nozzle elements.

4. An ink-jet recording apparatus according to claim 2, wherein said nozzle comprises a plurality of nozzle elements aligned in a predetermined interval along the direction of relative movement between said recording medium and said nozzle elements, said charging means and deflection means being provided in correspondence to said nozzle elements.

5. An ink-jet recording apparatus according to claim 3, wherein each of said charging means is connected to said speed signal generating means.

6. An ink-jet recording apparatus according to claim 4, wherein each of said charging means is connected to said speed signal generating means.

7. An ink-jet recording apparatus comprising:

ink droplet producing means having a nozzle for ejecting droplets of ink at a constant time interval through the nozzle;

means for moving a recording medium relative to a flight path of said ink droplets across said projectile line;

charging means for charging said ink droplets electrostatically;

deflection means which deflects the ink droplets to an extent in proportion to the amount of charges on said ink droplets along the direction of said relative movement;

capture means provided in part of said ink droplet flight path; and control means which controls said charging means in accordance with an information signal to be recorded so as to vary the amount of charges on said ink droplets so that ink droplets used for recording clear said capture means to reach said recording medium and ink droplets unused for recording are caught by said capture means, wherein said control means comprises:

signal generating means which produces a signal representing the relative speed between said ink droplet producing means and said recording medium; and charging modification means which modifies the amount of charges on said ink droplets, as determined basing on said information signal, in accordance with said speed signal.

8. An ink-jet recording apparatus according to claim 7, wherein a plurality of the combination of said ink droplet producing means, charging means, deflection means and capture means are provided in a predetermined interval along the direction of the relative movement between said ink droplet producing means and the recording medium, said control means including said speed signal generating means used commonly by said combinations, said charging modification means provided separately for each combination.

9. An ink-jet recording apparatus according to claim 7, wherein said ink droplet producing means produces ink droplets of a larger size and ink droplets of a smaller size alternately, said control means operating on said charging means to vary the amount of charges on said larger ink droplets and smaller ink droplets independently.

10. An ink-jet recording apparatus according to claim 8, wherein said ink droplet producing means produces ink droplets of a larger size and ink droplets of a smaller size alternately, said control means operating on said charging means to vary the amount of charges on said larger ink droplets and smaller ink droplets independently.

11. An ink-jet recording apparatus according to claim 9, wherein said ink droplet producing means provides a faster flying speed for said larger ink droplets than the speed of said smaller ink droplets, said charging means operating on said larger ink droplets used for recording to be deflected greater than said smaller ink droplets used for recording.

12. An ink-jet recording apparatus according to claim 10, wherein said ink droplet producing means provides a faster flying speed for said larger ink droplets than the speed of said smaller ink droplets, said charging means operating on said larger ink droplets used for recording to be deflected greater than said smaller ink droplets used for recording.

* * * * *